(12) United States Patent
Henley et al.

(10) Patent No.: US 11,394,191 B1
(45) Date of Patent: Jul. 19, 2022

(54) HIDDEN TEXT BASED LED INDICATORS FOR GFCIS AND RECEPTACLES

(71) Applicant: EATON INTELLIGENT POWER LIMITED, Dublin (IE)

(72) Inventors: Christopher G. Henley, Pittsburgh, PA (US); Chuanchuan Zhuang, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/315,623

(22) Filed: May 10, 2021

(51) Int. Cl.
| | |
|---|---|
| *H02H 3/04* | (2006.01) |
| *G08B 5/36* | (2006.01) |
| *H02H 3/16* | (2006.01) |
| *F21V 8/00* | (2006.01) |

(52) U.S. Cl.
CPC ............. *H02H 3/04* (2013.01); *G02B 6/0008* (2013.01); *G08B 5/36* (2013.01); *H02H 3/162* (2013.01)

(58) Field of Classification Search
CPC .......... G02B 6/0008; G08B 5/36; H02H 3/04; H02H 3/162; H01H 71/04; H01H 71/025; H01H 71/06; H01H 9/161; H01R 13/7135
See application file for complete search history.

(56) References Cited

U.S. PATENT DOCUMENTS

| | | | |
|---|---|---|---|
| 2005/0207136 A1* | 9/2005 | Jasper | G09F 13/22 362/253 |
| 2007/0041134 A1* | 2/2007 | Huang | H01H 71/123 361/42 |
| 2007/0188276 A1* | 8/2007 | Shi | H01H 83/04 335/6 |
| 2015/0333498 A1* | 11/2015 | Weeks | H01H 83/04 324/509 |
| 2016/0352092 A1* | 12/2016 | Weeks | H02H 3/00 |
| 2019/0252873 A1* | 8/2019 | Weeks | H01H 83/226 |

* cited by examiner

*Primary Examiner* — Jared Fureman
*Assistant Examiner* — Nicolas Bellido
(74) *Attorney, Agent, or Firm* — Eckert Seamans Cherin & Mellott, LLC

(57) ABSTRACT

A ground fault circuit interrupter (GFCI) electrical receptacle arrangement includes an indication system for clearly indicating the operating state of the GFCI. When the GFCI is in a trip state, a first window on a reset button illuminates to indicate to the user that the reset button needs to be actuated in order to re-close the circuit supplying power to the receptacles. When the GFCI is in an end-of-life state, a second window stating "Replace receptacle" illuminates. The windows are formed in portions of a wall of a front enclosure of the GFCI that are thinner than surrounding portions. A light pipe is disposed in the interior of the GFCI housing for each window between the window and an LED. When the LED is illuminated, the light pipe facilitates illumination of the window.

20 Claims, 7 Drawing Sheets

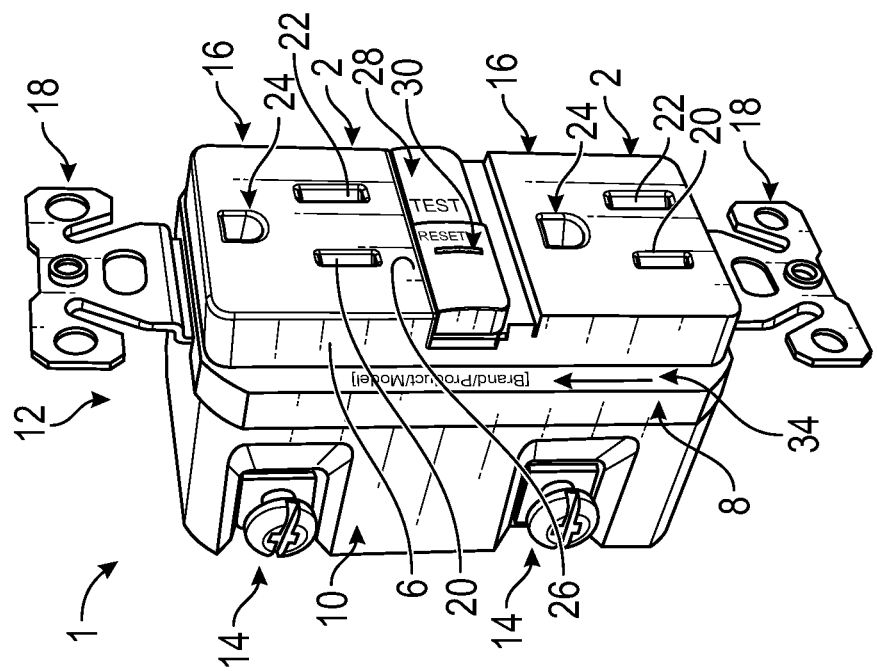
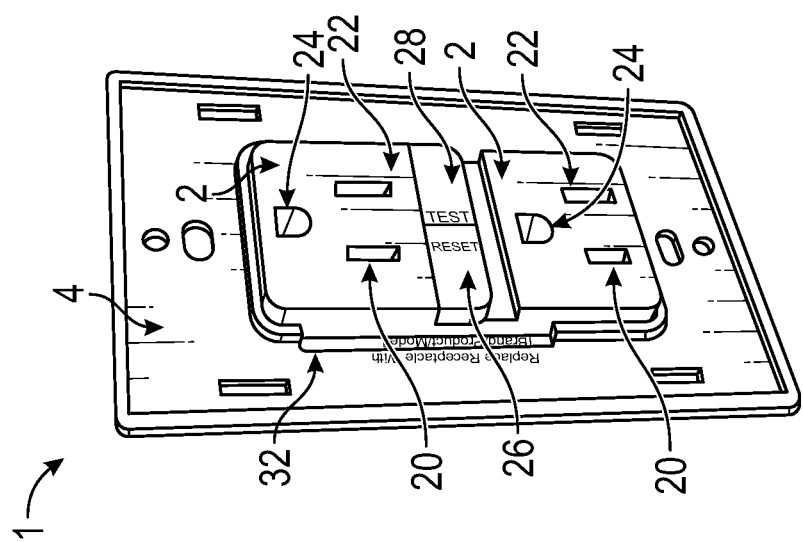
FIG. 1B
FIG. 1A

HIDDEN TEXT BASED LED INDICATORS FOR GFCIS AND RECEPTACLES

BACKGROUND

Field

The disclosed concept relates generally to ground fault circuit interrupter (GFCI) electrical receptacles and in particular, to devices for providing a non-ambiguous indication of the operating condition of GFCI receptacles.

Background Information

Electrical outlets enable devices and appliances with electrical plugs to connect to utility power sources in residential, commercial, and industrial settings. A ground fault circuit interrupter (GFCI) electrical receptacle is a specific type of circuit interrupter connected to an electrical outlet that can automatically shut off power at the electrical outlet when an electrical fault is detected, including situations when current follows an unintended path, as in the case of a ground fault. In areas that are prone to being wet or damp, a person using an electrical appliance is more prone to getting electrically shocked in comparison to a relatively dry area, and installing GFCI receptacles can greatly reduce the risk of injury for a person using an electrical appliance in a wet or damp area. In fact, the National Electrical Code (NEC) in the U.S. mandates GFCI protection in many areas within six feet of a sink or water source in a building, including: bathrooms, garages, outdoor receptacles, crawl spaces, basements, and kitchens.

Several models of GFCI receptacles that currently exist in the market typically use small LED indicators to display the status of the device when the device needs to be reset or replaced. However, because there is no standardized indication scheme across different GFCI manufacturers, GFCI users have noted confusion around the actual status of their GFCI devices. It is conceivable, for example, that several different brands or models of GFCIs could be featured within a single house, apartment, office building, or other structure, and an occupant may not realize that a particular GFCI receptacle needs to be reset or replaced due to the differing indication schemes used by the different GFCI receptacle models installed.

There is thus room for improvement in devices used to provide an indication of the operating condition of GFCI receptacles.

SUMMARY

In accordance with one aspect of the disclosed concept, a ground fault circuit interrupter (GFCI) arrangement comprises: a housing; a number of electrical receptacles, each of the number of receptacles comprising a hot slot structured to receive a hot prong of an electrical plug and structured to be electrically connected to a hot power source conductor and a neutral slot structured to receive a neutral prong of an electrical plug and structured to be electrically connected to a neutral power source conductor; electrical monitoring circuitry enclosed within the housing and electrically connected to the hot slot and the neutral slot, the monitoring circuitry being configured to monitor a plurality of operating conditions of the GFCI arrangement; and an indication system electrically connected to the monitoring circuitry and configured to indicate on the housing a plurality of indication states indicative of the operating conditions of the GFCI arrangement. The indication system comprises a number of indication windows formed on a rear side of the front of the housing within an interior of the housing and a number of illumination arrangements enclosed within the housing. The number of illumination arrangements corresponds in number to the number of indication windows such that each one of the illumination arrangements is structured to illuminate a corresponding one of the indication windows. At least one of the indication windows includes a body of text formed on the rear side of the front of the housing, said body of text being structured to be visible only when illuminated by its corresponding illumination arrangement. The plurality of indication states comprises a normal operating state and a trip condition state, and a first of the number of illumination arrangements corresponding to the trip state is structured to illuminate a corresponding first of the number of indication windows upon detection of the trip condition state by the monitoring circuitry.

In accordance with another aspect of the disclosed concept, an electrical receptacle arrangement comprises: a housing; a number of electrical receptacles, each of the number of receptacles comprising a hot slot structured to receive a hot prong of an electrical plug and a neutral slot structured to receive a neutral prong of an electrical plug; electrical monitoring circuitry enclosed within the housing and electrically connected to the hot slot and the neutral slot, the monitoring circuitry being configured to monitor a plurality of operating conditions of the receptacle arrangement; and an indication system electrically connected to the monitoring circuitry and configured to indicate on the housing a plurality of indication states indicative of the operating conditions of the receptacle arrangement. The indication system comprises a number of indication windows formed on a rear side of the front of the housing within an interior of the housing and a number of illumination arrangements enclosed within the housing. The number of illumination arrangements corresponds in number to the number of indication windows such that each one of the illumination arrangements is structured to illuminate a corresponding one of the indication windows. The plurality of indication states comprises a normal operating state, a trip condition state, and an end-of-life state. A first of the illumination arrangements corresponding to the trip state is structured to illuminate a corresponding first of the indication windows upon detection of the trip condition state by the monitoring circuitry, and a second of the illumination arrangements corresponding to the end-of-life state is structured to illuminate a corresponding second of the indication windows upon detection of the end-of-life state by the monitoring circuitry. In addition, the second of the indication windows includes a body of text formed in the window, said body of text denoting the end-of-life state and being structured to be visible only when illuminated by the second illumination arrangement.

In accordance with a further exemplary embodiment of the disclosed concept, an electrical receptacle arrangement comprises: a housing; a number of electrical receptacles, each of the number of receptacles comprising a hot slot structured to receive a hot prong of an electrical plug and a neutral slot structured to receive a neutral prong of an electrical plug; electrical monitoring circuitry enclosed within the housing and electrically connected to the hot slot and the neutral slot, the monitoring circuitry being configured to monitor a plurality of operating conditions of the receptacle arrangement; and an indication system electrically connected to the monitoring circuitry and configured to indicate on the housing a plurality of indication states indicative of the operating conditions of the receptacle arrangement. The indication system comprises a number of indication windows formed on an interior side of the housing and a number of illumination arrangements enclosed within the housing. The number of illumination arrangements corresponds in number to the number of indication windows such that each one of the illumination arrangements is structured to illuminate a corresponding one of the indication windows, and each of the number of illumination arrangements comprises a light source electrically connected to the monitoring circuitry and a light pipe. For each indication window, at least a portion of the indication window is thinner than a portion of the interior side of the housing surrounding the indication window. The plurality of indication states comprises a normal operating state, a trip condition state, and an end-of-life state. A first of the illumination arrangements corresponding to the trip state is structured to illuminate a corresponding first of the indication windows upon detection of the trip condition state by the monitoring circuitry, and a second of the number of illumination arrangements corresponding to the end-of-life state is structured to illuminate a corresponding second of the indication windows upon detection of the end-of-life state by the monitoring circuitry. In addition, the second of the indication windows includes a body of text formed in the window, said body of text denoting the end-of-life state and being structured to be visible only when illuminated by the second illumination arrangement.

BRIEF DESCRIPTION OF THE DRAWINGS

A full understanding of the disclosed concept can be gained from the following description of the preferred embodiments when read in conjunction with the accompanying drawings in which:

FIG. 1A is a partial isometric front view of an arrangement of pair of GFCI electrical receptacles fitted within a wall plate, in accordance with an exemplary embodiment of the disclosed concept;

FIG. 1B is a partial isometric front view of the arrangement shown in FIG. 1A with the wall plate removed and shown indicating a trip state, in accordance with an exemplary embodiment of the disclosed concept;

DESCRIPTION OF THE PREFERRED EMBODIMENTS

Figure 1C:
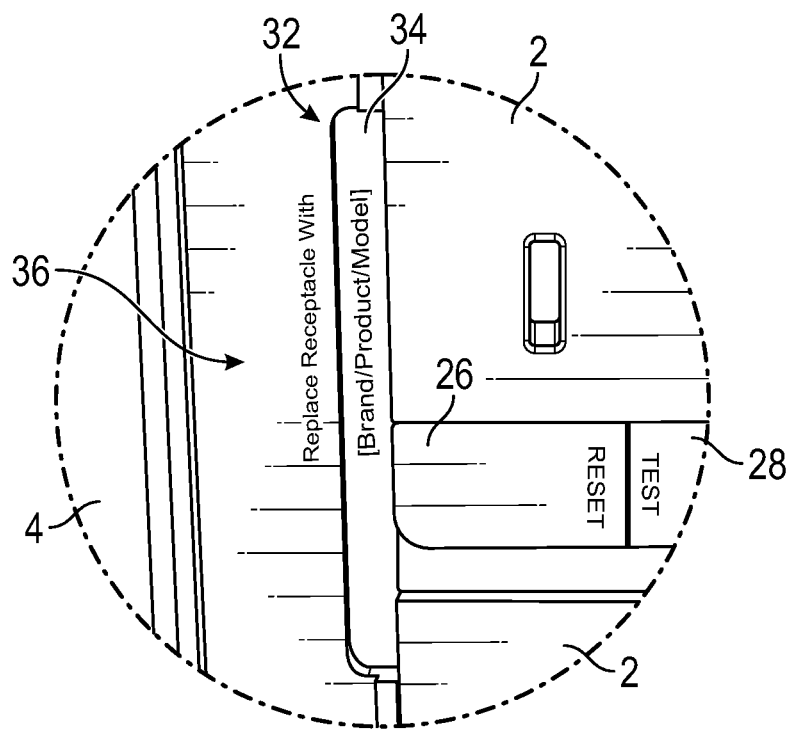
FIG. 1C is a detail view of a portion of the arrangement shown in FIG. 1A.

Directional phrases used herein, such as, for example, left, right, front, back, top, bottom and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As used herein, the term "controller" shall mean a number of programmable analog and/or digital devices (including an associated memory part or portion) that can store, retrieve, execute and process data (e.g., software routines and/or information used by such routines), including, without limitation, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. As used herein, "movably coupled" means that two components are coupled so as to allow at least one of the components to move in a manner such that the orientation of the at least one component relative to the other component changes.

As employed herein, the term "number" shall mean one or an integer greater than one (i.e., a plurality).

FIG. 1A shows a GFCI arrangement 1 of a pair of GFCI electrical receptacles 2, produced in accordance with an exemplary embodiment of the disclosed concept, operating in a normal state and fitted within a wall plate 4. FIG. 1B shows the GFCI arrangement 1 of FIG. 1A in a trip state with the wall plate 4 removed. As shown in FIG. 1B, GFCI arrangement 1 comprises a front enclosure 6, a middle enclosure 8, and a rear enclosure 10. The front enclosure 6, middle enclosure 8, and rear closure 10 may be collectively referred to as the housing 12.

As used herein, the term "front" denotes the side of a component of the GFCI arrangement 1 that would face an electrical plug positioned for insertion into either of the electrical receptacles 2. Accordingly, the term "rear" as used herein denotes the side of a GFCI arrangement 1 component disposed opposite the front side, i.e. the side of the component that would face away from the interior of a room if the GFCI arrangement 1 were installed in a wall of the room. In addition, the term "interior" as used herein with respect to the GFCI arrangement 1 refers to the space enclosed within the housing 12 and the term "exterior as used herein with respect to the GFCI arrangement 1 refers to the space not enclosed within the housing 12.

GFCI arrangement 1 also comprises a number of hot lugs 14 and a number of neutral lugs 16 (not visible in the view shown in FIGS. 1A and 1B) structured to be electrically connected to hot and neutral conductors connected to utility power (or another power source) when the GFCI arrangement 1 is installed within a building wall. While the neutral lugs 16 are not visible in the views shown in FIGS. 1A and 1B, it will be appreciated that the neutral lugs 16 are coupled to a surface of the rear enclosure 10 disposed opposite and parallel to the surface of rear enclosure 10 to which the hot lugs 14 are coupled. GFCI arrangement 1 also comprises a grounding strap 18 structured to shunt excessive current to ground.

Still referring to FIG. 1B, each receptacle 2 comprises a hot slot 20, a neutral slot 22, and a ground slot 24 that are electrically connected to the hot lugs 14, neutral lugs 16, and ground strap 18, respectively. It will be appreciated that when the GFCI arrangement 1 is installed within a wall such that the hot lugs 14 and the neutral lugs 16 are electrically connected to the hot and neutral conductors (referred to hereinafter as the "hot utility conductor" and "neutral utility conductor") supplying power to the building from a utility, the hot slot 20 and a neutral slot 22 of each receptacle 2 are also electrically connected to the hot and neutral utility conductors. As is known in the field of GFCI receptacles, the housing 12 encloses fault detection circuitry 60 (schematically depicted and described in more detail herein with respect to FIG. 3) that, upon detection of a fault condition, opens at least one of the current paths between the hot slot 20 and the hot utility conductor (such current path being referred to hereinafter as the "hot power branch") or between the neutral slot 22 and the neutral utility conductor (such current path being referred to hereinafter as the "neutral power branch").

It will be appreciated that the normal state (depicted in FIG. 1A) of GFCI arrangement 1 is that in which both the hot power branch is closed and the neutral power branch is closed such that, when a device is plugged into one of the receptacles 2, current is able to flow from the hot power branch through the internal device circuit and then through the neutral branch of the receptacle 2. It will be appreciated that a trip state (depicted in FIG. 1B) of GFCI arrangement 1 is one in which at least one of the hot power branch or the neutral power branch are opened such that current cannot flow through a device plugged into either of the receptacles 2.

Accordingly, GFCI arrangement 1 comprises a reset button 26 and a test button 28. When the GFCI arrangement 1 is operating in a normal state, the reset button 26 is disposed in a first indication state wherein its front surface is flush with the front surface of the test button 28, as depicted in FIG. 1A. In an exemplary embodiment of the disclosed concept, when a fault condition is detected by the fault detection circuitry 60, the fault detection circuitry 60 trips open either of the hot power branch or neutral power branch and causes the reset button 26 to enter a second indication state, which is the trip state depicted in FIG. 1B. In an exemplary embodiment as shown in FIG. 1B, a reset window 30 of the reset button 26 illuminates and the front surface of the reset button 26 extends outward relative to the front surface of the test button 28 in the trip state. In the same exemplary embodiment, the hot and/or neutral power branch that was opened upon detection of the fault state can be reclosed by pushing the reset button 26 back into the first indication such that its front surface is again flush with the front surface of the test button 28, as shown in FIG. 1A. As is known, it is recommended to test the tripping functionality of GFCI receptacles such as GFCI receptacles 2 about once a month, and it will be appreciated that when the GFCI arrangement 1 is operating in a normal operating state such that the reset button 26 is disposed in the first indication state shown in FIG. 1A, the test button 28 of the GFCI arrangement can be pushed to actuate the reset button 26 into the second indication state shown in FIG. 1B.

FIG. 1C shows a detail view of a portion of the GFCI arrangement 1 shown in FIG. 1A in order to highlight a feature of the GFCI arrangement 1 that informs the user what the brand and model of the GFCI arrangement 1 are, in the event that any components need to be replaced. In particular, an opening 32 included in an exemplary embodiment of wall plate 4 reveals a portion 34 of the middle enclosure 8 on which the brand name and series model of the GFCI are displayed. Additionally, as shown in FIG. 1C, a block of text 36 is included on wall plate 4 to draw the user's attention to the portion 34 of middle enclosure 8 containing product information about the GFCI arrangement 1. In the exemplary embodiment shown in FIG. 1C, text 36 states "Replace Receptacle With"; however, text 36 can include different words from those shown in FIG. 1C, icons or shapes instead of or in addition to words, or text 36 may be omitted from wall plate 4 altogether without departing from the scope of the disclosed concept.

Figure 1D:
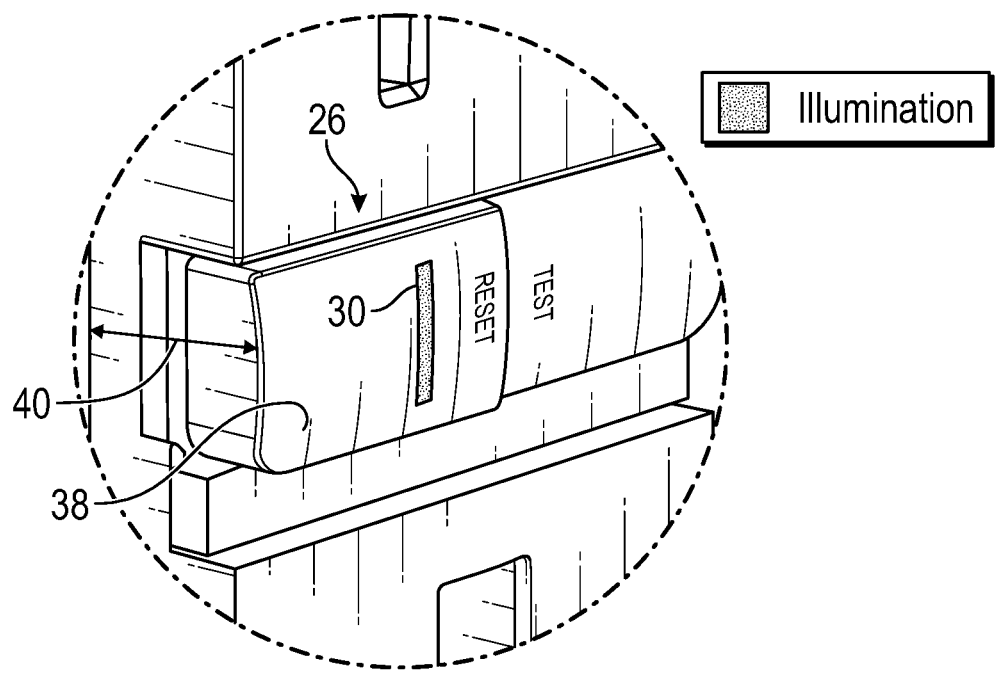
FIG. 1D is a detail view of a portion of the arrangement shown in FIG. 1B.

FIG. 1D shows a detail view of a portion of the GFCI arrangement 1 shown in FIG. 1B in order to highlight features of the reset button 26. As will be detailed later herein with respect to FIGS. 2A-2G, the illumination of reset window 30 by an illumination arrangement upon detection of a trip condition is facilitated by a difference in thickness between the portion of the wall of reset button 26 comprising reset window 30 and the thickness of the non-window portion 38 of reset button 26. Specifically, reset window 30 is thinner than the surrounding non-window portion 38 when measured in a rear-to-front direction indicated by line 40 in FIG. 1D.

Figure 1E:
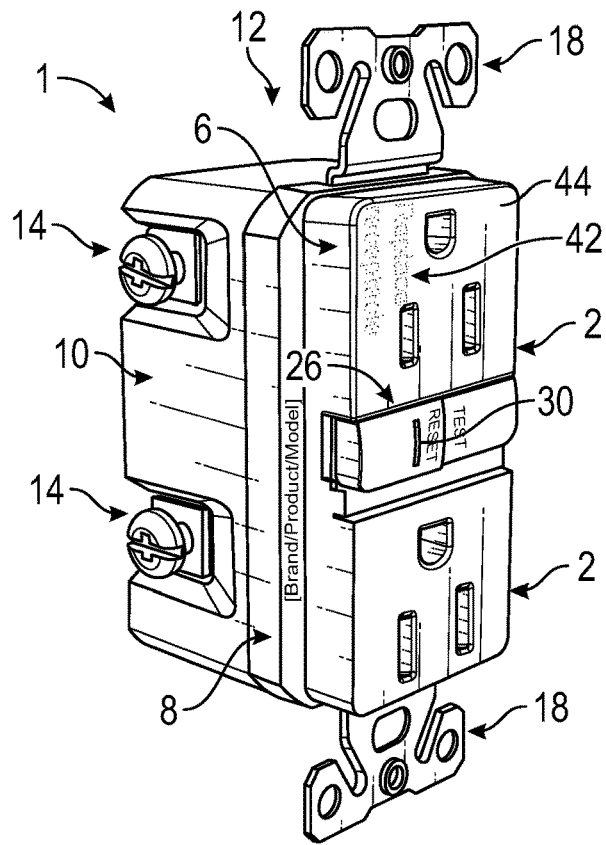
FIG. 1E is a partial isometric view of the arrangement shown in FIG. 1B and shown indicating an end-of-life state, in accordance with an exemplary embodiment of the disclosed concept.

FIG. 1E shows the GFCI arrangement 1 in a third indication state wherein the GFCI indicates an end-of-life state, in accordance with an exemplary embodiment of the disclosed concept. For example and without limitation, the GFCI arrangement 1 would indicate an end-of-life state if the GFCI arrangement 1 was no longer capable of tripping.

Figure 1F:
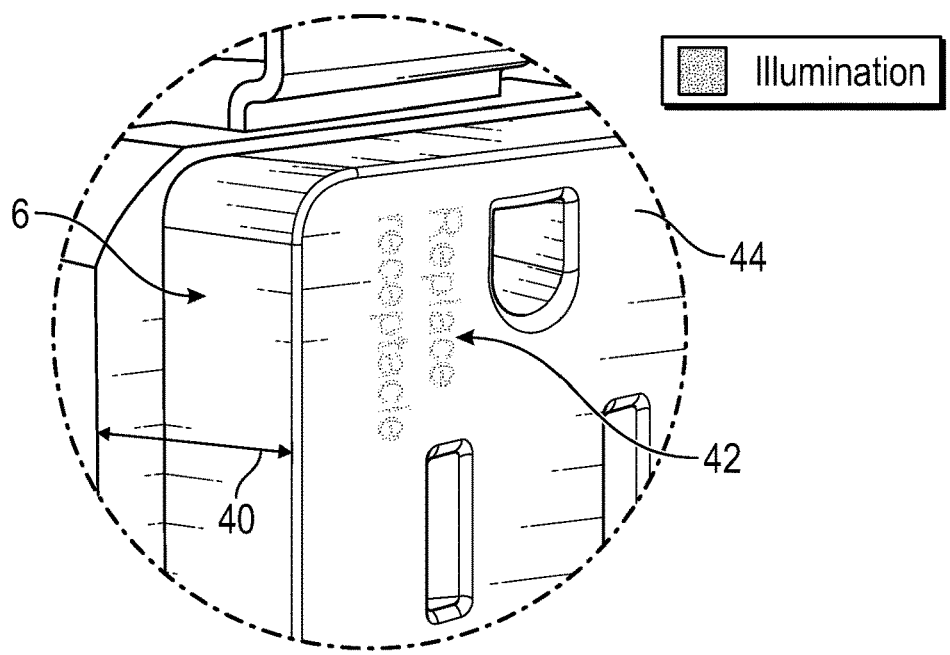
FIG. 1F is a detail view of a portion of the arrangement shown in FIG. 1E.

It will be appreciated that the depiction of GFCI arrangement 1 shown in FIG. 1E is similar to the depiction shown in FIG. 1B, except that the depiction shown in FIG. 1E additionally shows a replacement window 42 illuminated in addition to the illumination of reset window 30. FIG. 1F shows a detail view of the illuminated replacement window 42 shown in FIG. 1E. Similarly to the reset window 30 and the non-window portion 38 of reset button 26 shown in FIG. 1D, replacement window 42 comprises a portion of front enclosure 6 that is thinner than the surrounding non-window portion 44 of front enclosure 6 (thinness and thickness again being measured in the rear-to-front direction indicated by line 40 in FIG. 1F), which facilitates illumination of replacement window 42 by an illumination arrangement (described in more detail herein with respect to FIGS. 2A-2G). In an exemplary embodiment of the disclosed concept as shown in FIGS. 1E and 1F, the end-of-life state is unambiguously indicated to the user because the illumination of replacement window 42 causes a body of text stating "Replace receptacle" to become visible. However, it will be appreciated that replacement window 42 can include other suitable text instead of "Replace receptacle" that similarly denotes the end-of-life state of GFCI arrangement 1 without departing from the scope of the disclosed concept. The formation of the text in replacement window 42 is detailed herein below with respect to FIGS. 2A and 2B.

Figure 2A:
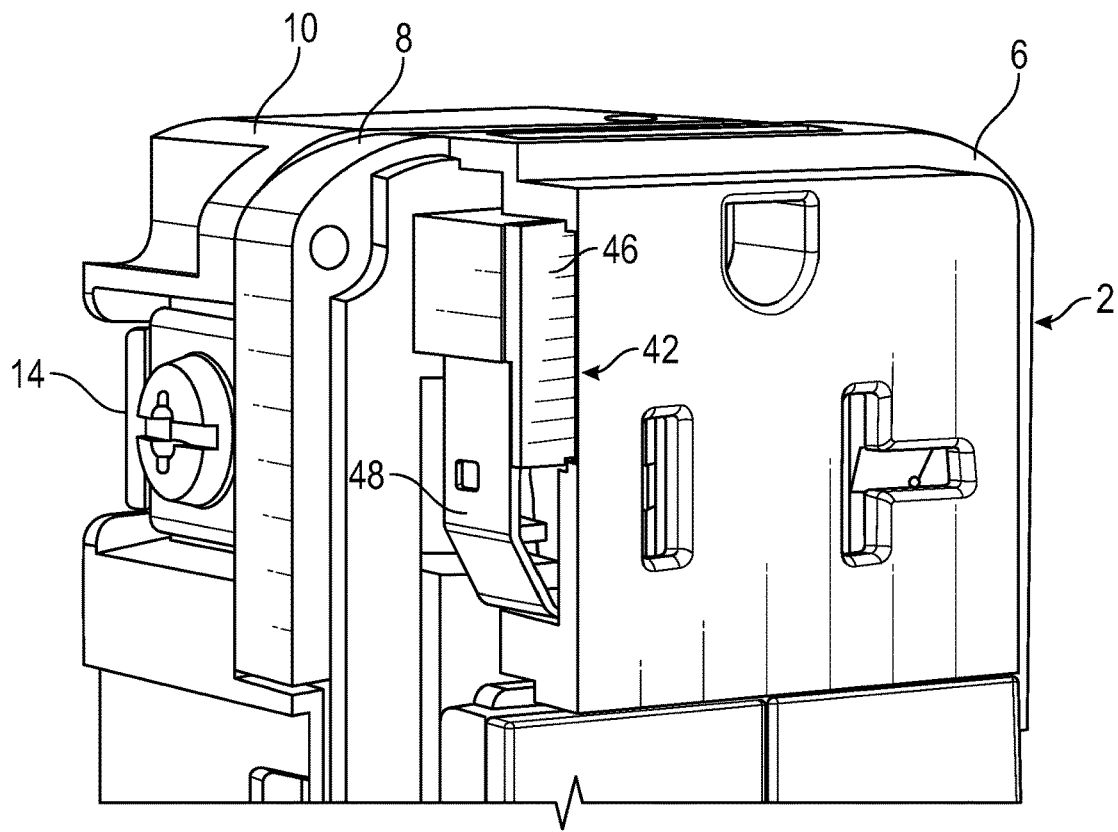
FIG. 2A is a detail view of a portion of the arrangement shown in FIG. 1E with a portion of the front GFCI enclosure removed, showing how a light pipe is positioned within the arrangement to illuminate text that is molded/embossed into the front GFCI enclosure (said text being shown in FIG. 2B) in order to indicate an end-of-life state, in accordance with an exemplary embodiment of the disclosed concept.
Figure 2B:
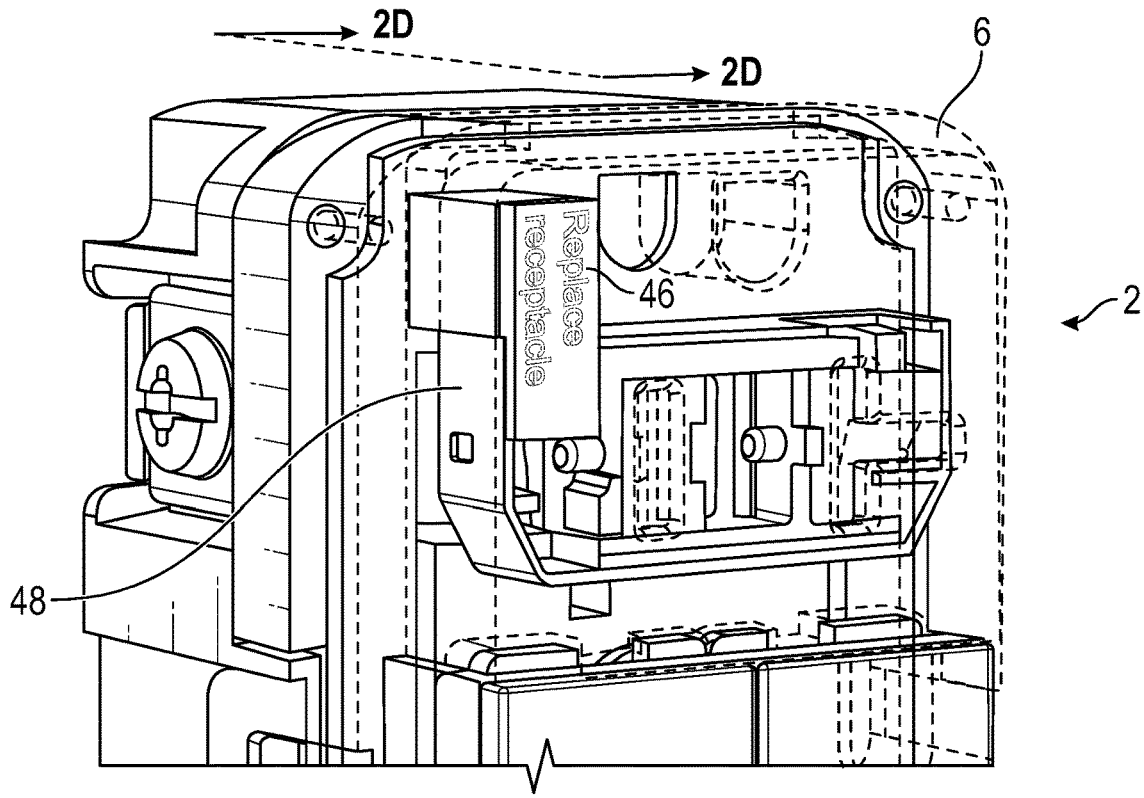
FIG. 2B shows a detail front view of the same portion of the arrangement shown in FIG. 2A, with the entire front GFCI enclosure in place and rendered transparent, in order to further show how the text is molded/embossed into the front GFCI enclosure, in accordance with an exemplary embodiment of the disclosed concept.

FIG. 2A shows a detail front view of GFCI arrangement 1 with a portion of the front enclosure 6 removed in order to show how a light pipe 46 is positioned within the receptacle 2 to illuminate the text of replacement window 42 when the arrangement 1 is in an end-of-life state. FIG. 2B shows the view of the GFCI arrangement shown in FIG. 2A, but with the entire front enclosure 6 in place and rendered transparent, in order to show how the text visible when the replacement window 42 illuminates is molded, embossed, or otherwise similarly formed into the rear side of the front enclosure 6 such that the text is disposed in the interior of housing 12, in accordance with an exemplary embodiment of the disclosed concept. It should be noted that, while reset button 26 is depicted in FIGS. 1A-1F as having the word "RESET" printed on the exterior side of reset button 26, it is within the scope of the disclosed concept to produce the text on reset button 26 (or any other text which may appear on the housing 12) in the same manner than the text of replacement window 42 is produced, i.e. by molding, embossing, or otherwise similarly forming the text into the rear side of the front enclosure 6 such that the text is disposed in the interior of housing 12.

In addition, FIGS. 2A and 2B show a tamper resistant (TR) shutter 48 included in each receptacle 2 of the GFCI arrangement 1 that prevents an object improperly inserted into a receptacle 2 from accessing the live hot and neutral utility conductors. TR shutter 48 is structured to expose openings that allow access to the live hot and neutral utility conductors only when a standardized two-pronged or three-pronged grounded electrical plug is inserted into an electrical receptacle 2, and is structured to prevent a non-plug object inserted into only the hot slot 14 or only the neutral slot 16 from accessing the respective hot or neutral conductor. TR shutter 48 is intended to protect, for example and without limitation, a child who sticks an object into only one of the hot slot 14 or neutral slot 16 from an electrocution hazard. While FIGS. 2A and 2B show the alignment of the light pipe 46 with the text of the replacement window 42, the interaction of the GFCI arrangement 1 components that enable to replacement window text 42 to be illuminated can be better understood by viewing FIGS. 2C-2G, which are described in more detail below.

Figure 2C:
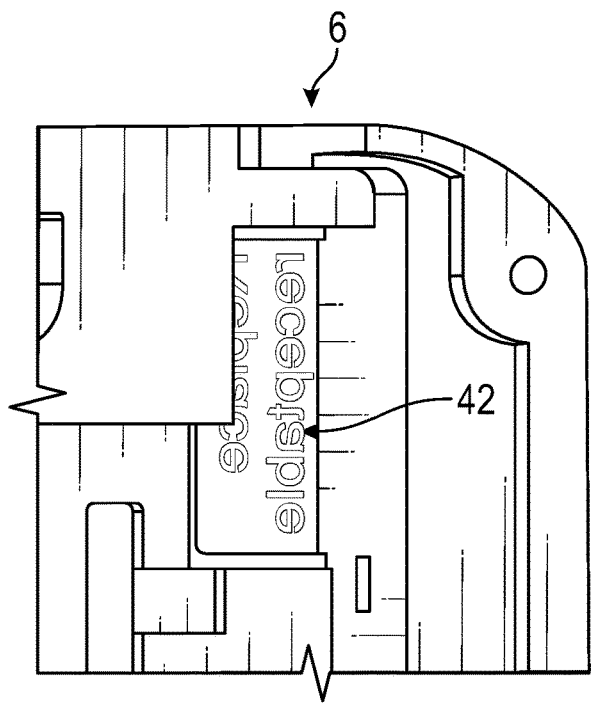
FIG. 2C is a partial isometric rear detail view of the portion of the front GFCI enclosure containing the text shown in FIGS. 1E, 1F, and 2B, showing an alternative view of how the text is molded/embossed into the rear side of the front GFCI enclosure, in accordance with an exemplary embodiment of the disclosed concept.

FIG. 2C shows a view of a portion of the rear side of front enclosure 6, which shows how text of the replacement window 42 is formed in the rear side of the front enclosure 6 in an exemplary embodiment of the disclosed concept. It should be noted that the text of replacement window 42 can include words other those shown in FIG. 2C (which are also shown in FIGS. 1E, 1F, an 2B), or icons or shapes instead of or in addition to words, without departing from the scope of the disclosed concept. In one exemplary embodiment, the text of replacement window 42 can be produced by forming front enclosure 6 with a mold. In another exemplary embodiment of the disclosed concept, the text of replacement window 42 can be produced by embossing front enclosure 6. It will be appreciated that suitable methods other than molding or embossing which produce replacement window 42 to have a thinner wall than the surrounding non-window portion 44 of front enclosure 6 can be used without departing from the scope of the disclosed concept. For the sake of brevity, the difference in thickness between reset window 30 and the non-window portion 38 of reset button 26 (shown in FIG. 1D) is not shown in additional figures, but it will be appreciated that reset window 30 is relatively thin compared to the non-window portion 38 of reset button 26 in a manner analogous to how replacement window 42 is relatively thin compared to the non-window portion 44 of front enclosure 6 (as shown in FIG. 2D).

Figure 2D:
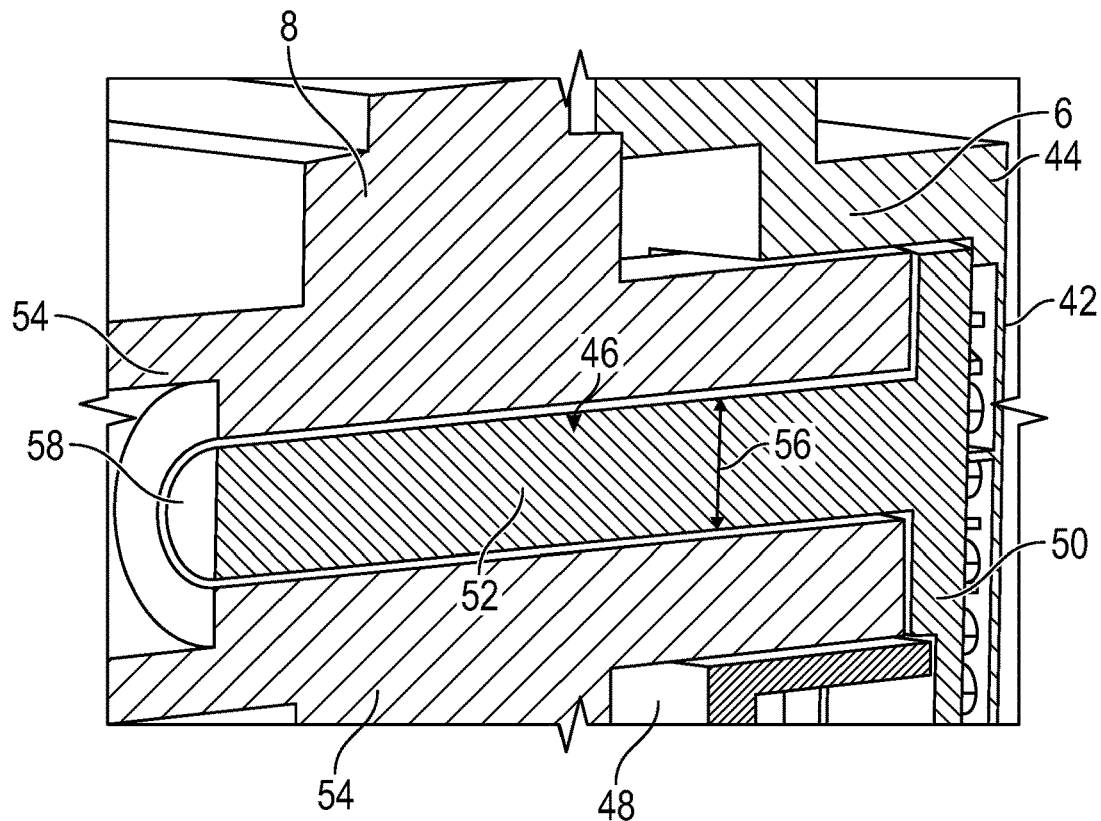
FIG. 2D is a sectional view of the arrangement shown in FIG. 2B as indicated by the line 2D-2D shown in FIG. 2B.

FIG. 2D shows a detail sectional view of the GFCI arrangement 1 as indicated by line 2D-2D shown in FIG. 2B. In particular, FIG. 2D. shows how an illumination arrangement comprising light pipe 46 is positioned relative to replacement window 42 in order to illuminate replacement window 42. In addition, FIG. 2D shows how the portion of front enclosure 6 comprising replacement window 42 is thinner than the adjacent non-window portion 44. Producing replacement window 42 to be thinner than the non-window portion 44 eliminates the need for light pipe 46 to extend through the front enclosure 6, as the relative thinness of replacement window 42 enables light transmitted by light pipe 46 to be visible from the front side of front enclosure 6 through the replacement window 42 while not being visible through the non-window portion 44. In addition, FIG. 2D shows how a first, vertical portion 50 of the light pipe 46 is disposed vertically (relative to the view shown in FIG. 2D) between the front side of the middle enclosure 8 and the rear side of the portion of the front enclosure 6 containing replacement window 42, and how a second, horizontal portion 52 (horizontal relative to the view shown in FIG. 2D) of the light pipe 46 extends from a first, front end continuous with the vertical portion 50 at the front side of middle enclosure 8 to a second, rear end 58 disposed opposite the first end at a rear side of middle enclosure 8.

Lastly, FIG. 2D shows how the components of GFCI arrangement 1 are formed in a manner unique to the present disclosure. In one non-limiting example, the body 54 of middle enclosure 8 is formed with an opening 56 that extends the length of horizontal portion 52 of light pipe 46 and is structured to receive the horizontal portion 52 of light pipe 46. In another non-limiting example, vertical portion 50 of light pipe 46 includes varying thicknesses at its top section and bottom section ("top" and "bottom" being relative to the view shown in FIG. 2D). Specifically, the top section of vertical portion 50 is of one thickness in order to fit between the non-window portions 44 of front enclosure 6 and the body 54 of middle enclosure 8, while the bottom section of vertical portion 50 is of a different thickness than the top section in order to fit between the TR shutter 48 and the non-window portions 44 of front enclosure 6.

Figure 2E:
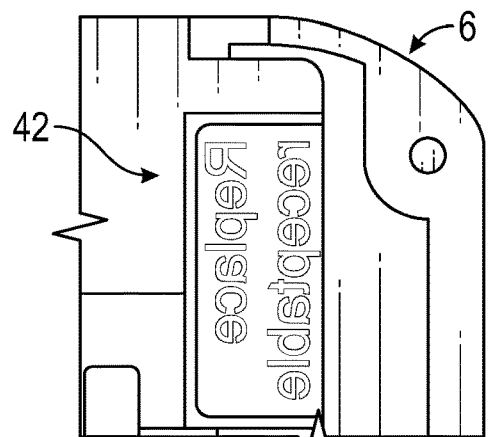
FIG. 2E is a rear elevation view of the portion of the front GFCI enclosure shown in FIG. 2C.
Figure 2F:
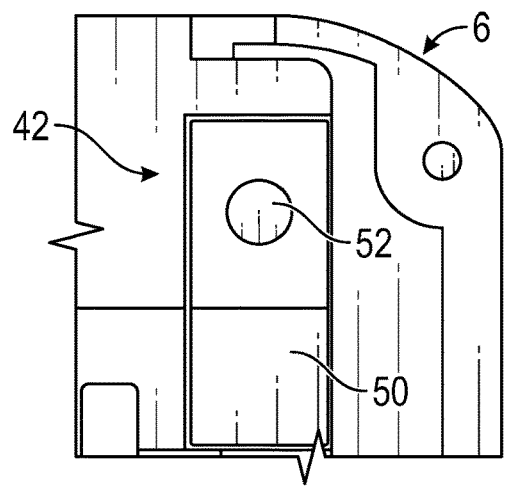
FIG. 2F shows the view shown in FIG. 2E when a light pipe is positioned within the arrangement as shown in FIG. 2D.
Figure 2G:
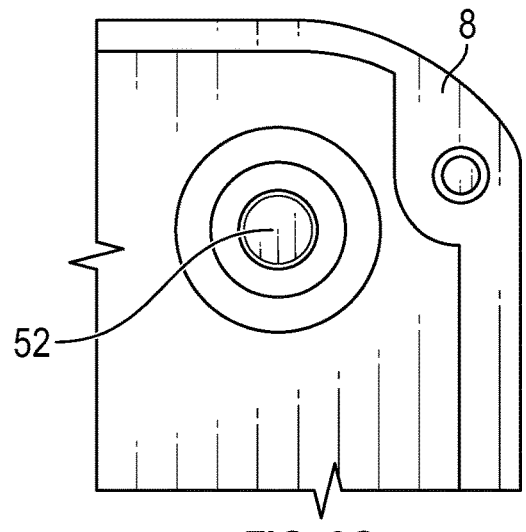
FIG. 2G shows the view shown in FIG. 2F when a middle enclosure of the GFCI housing is positioned within the arrangement as shown in FIG. 2D.

FIGS. 2E-2G provide a step-by-step overview of how front enclosure 6, light pipe 46, and middle enclosure 8 are assembled so that light pipe 46 is aligned to properly illuminate replacement window 42 of front enclosure 6. FIG. 2E shows an elevation view of the rear side of the portion of front enclosure 6 shown in FIG. 2C. FIG. 2F shows the elevation view of front enclosure 6 shown in FIG. 2E after vertical portion 50 of light pipe 46 has been aligned with replacement window 42 and placed on the rear side of front enclosure 6. FIG. 2G shows the elevation view of the front closure 6 and light pipe 46 shown in FIG. 2F after the horizontal portion 52 of light pipe 46 has been inserted into opening 54 of middle enclosure 8 such that middle enclosure 8, light pipe 46, and front enclosure 6 have been coupled together as shown in FIG. 2D.

It will be appreciated that a light pipe operates by channeling the light produced by a light source and disposed adjacent to an opening of the light pipe. Referring briefly again to FIG. 2D, a light source 62 (not shown in FIG. 2D but depicted schematically in FIG. 3) is disposed adjacent to the rear end 58 of the horizontal portion 52 of light pipe 46, and when the light source 62 is illuminated, the light travels frontward from rear end 58 of light pipe 46 through the horizontal portion 52 toward and into the vertical portion 50, resulting in the illumination of the text embossed into replacement window 42. Light pipe 46 and light source 62 can be collectively referred to as the aforementioned illumination arrangement.

For the sake of brevity, the arrangement of a light pipe aligned with reset window 30 of reset button 26 is not shown in a separate set of figures, however, it will be appreciated that a light pipe analogous to light pipe 46 and an opening analogous to opening 54 of middle enclosure 8 is provided within the portions of front enclosure 6 and middle enclosure 8 aligning with reset window 30 in order to illuminate reset window 30 after the detection of a trip condition. It will also be appreciated that a light source analogous to light source 62 is similarly provided at adjacent to an end of the light pipe provided for reset window 30 analogous to the end 58 of light pipe 46. Accordingly, it should be noted that subsequent explanations of how various components of GFCI arrangement 1 work to illuminate replacement window 42 using light pipe 46 apply to illumination of reset window 30 as well.

Figure 3:
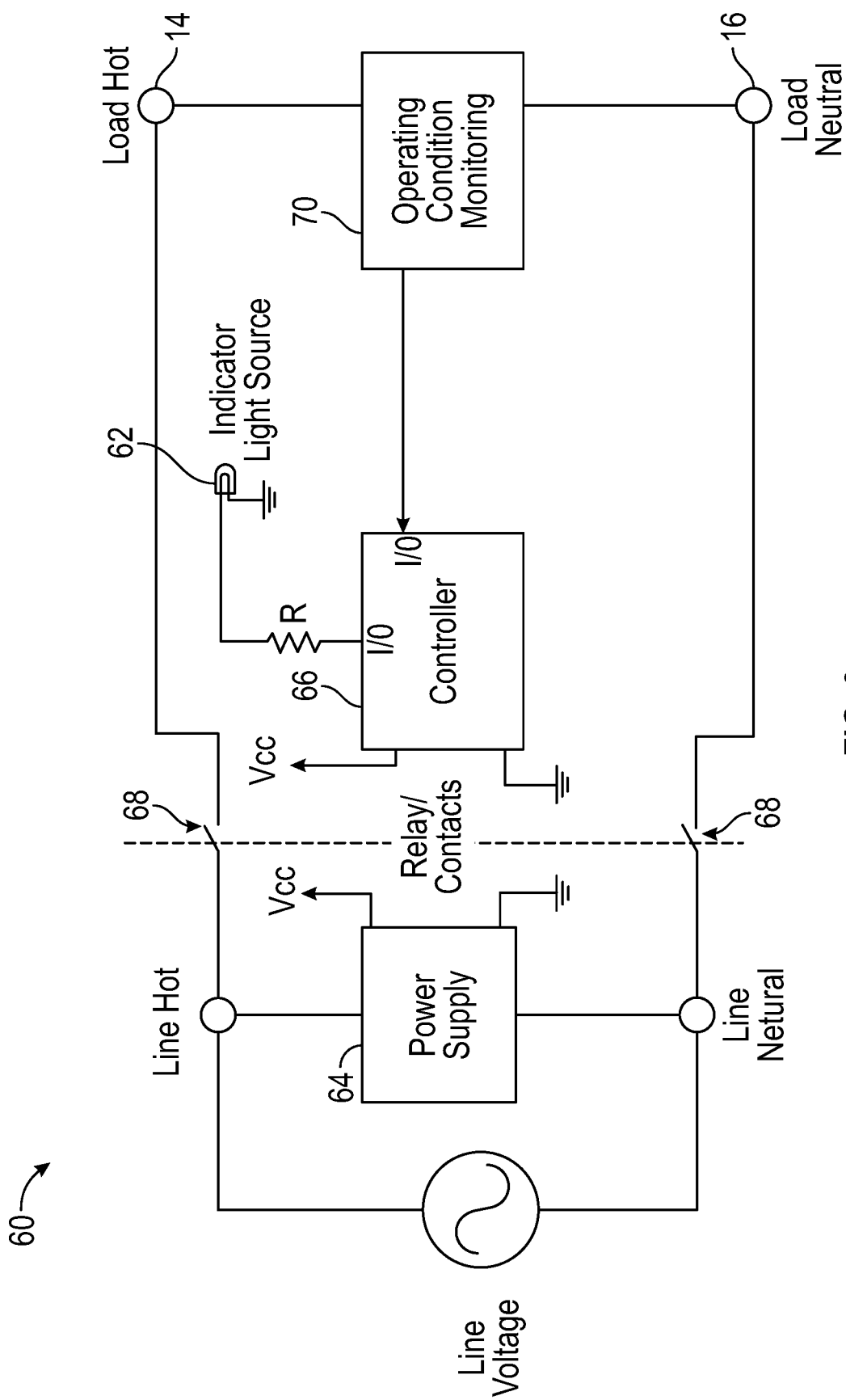
FIG. 3 is a simplified schematic depiction of circuitry enclosed within the housing of the GFCI arrangement (such housing being depicted in FIG. 1B) that monitors the operating condition of the GFCI arrangement and selectively illuminates indication windows of the GFCI upon detection of conditions warranting indication to the user.

Referring now to FIG. 3, a schematic depiction of a simplified operating condition and fault detection circuit 60 that can be used to illuminate replacement window 42 (and similarly illuminate reset window 30) is shown. In an exemplary embodiment of the disclosed concept, circuit 60 is produced as a printed circuit board (PCB) enclosed within housing 12 and coupled to the rear enclosure 10. While the precise workings of the circuitry 60 are not the focus of the present disclosure, an abbreviated explanation is provided herein in order to explain how the replacement window 42 and reset window 30 are selectively illuminated.

Indicator light source 62 is depicted in circuit 60, and that light source 62 is the light source that can be disposed adjacent to rear end 58 of light pipe 46 (as previously discussed with respect to FIG. 2D), in order to facilitate the travel of light through light pipe 46 to illuminate replacement window 42. Light source 62 can comprise, for example and without limitation, an LED. In the aforementioned exemplary embodiment where circuit 60 is formed on a PCB, the LED or other light source 62 is board mounted to the PCB. A power supply 64 is structured to be electrically connected to the utility line and neutral conductors when the GFCI arrangement 1 is installed in a building wall. The power supply 64 ensures that power provided to a controller 66 is regulated, in order to prevent damage to the controller 66 by extreme power conditions that can arise from connecting the controller 66 directly to the utility conductors. A pair of relays/contacts 68 are provided, which controller is configured to cause to open and close in order to ensure that current from power supply 64 flows to controller 66 only under predetermined acceptable conditions (e.g. non-fault conditions).

A schematically depicted section of operating condition monitoring circuitry 70 is in electrical communication with controller 66. Monitoring circuitry 70 comprises circuitry for determining, among other things, the level of current flowing through a load electrically connected to the GFCI arrangement 1 is (such load comprising, for example, a device plugged into one of the receptacles 2), as well as the general operating condition of GFCI arrangement 1 (i.e. to determine if GFCI arrangement 1 is in an end-of-life state such that it needs to be replaced). Examples of possible operating conditions that can be determined by monitoring circuitry 70 include: normal, reset, and end-of-life.

When controller 66 receives information from monitoring circuitry 70 indicative of an end-of-life state (e.g. an indication that the GFCI arrangement 1 is no longer functioning as intended because it is unable to actuate a trip during an overcurrent condition), controller 66 provides power to light source 62, in order to illuminate replacement window 42 and indicate to the user that GFCI arrangement 1 is in an end-of-life state and needs to be replaced. In comparing FIG. 1E to FIG. 1B, it should be noted that the text of replacement window 42 is not visible from the front side of front enclosure 6 unless light source 62 is powered on and illuminating replacement window 42. Similarly, and assuming for illustrative purposes that light source 62 is disposed within GFCI arrangement 1 to illuminate reset widow 30 instead of replacement window 42, when controller 66 receives information from monitoring circuitry 70 indicative of a fault condition (e.g. a ground fault), controller 66 actuates a trip to open either or both of the relays 68. After controller 66 receives information from monitoring circuitry 70 indicating that a trip has been actuated, controller 66 provides power to light source 62 in order to illuminate reset window 30 and indicate to the user that GFCI arrangement 1 is in a trip state.

Having described the figures, it will be appreciated that the exemplary embodiments of the disclosed concept provide a mechanism to clearly indicate to a user what the status of GFCI arrangement 1 is. By illuminating text that explicitly states the status of GFCI arrangement 1, GFCI arrangement 1 eliminates any ambiguity around the message being communicated by its indication scheme. In addition, the disclosed concept advantageously eliminates the possibility of light pipe 46 sustaining damage that may obscure the message conveyed by the illumination of light source 62 (when an indication condition such as a reset state or end-of-life state exists) by fully enclosing light pipe 46 within housing 12 rather than extending light pipe 46 through the front side of front enclosure 6 such that light pipe 46 is exposed to the surrounding environment of GFCI arrangement 1. The full enclosure of light pipe 46 within housing 12 is made possible by producing reset window 30 to be thinner than the surrounding non-window portion 38 and similarly producing replacement window to be thinner than the surrounding non-window portion 44 so that the text provided on the reset window 30 and the text provided on the replacement window 42 stands in clear relief compared to the respective surrounding non-window portions 38 and 44.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A ground fault circuit interrupter (GFCI) arrangement comprising:
    a housing;
    a number of electrical receptacles, each of the number of receptacles comprising:
        a hot slot structured to receive a hot prong of an electrical plug and structured to be electrically connected to a hot power source conductor; and
        a neutral slot structured to receive a neutral prong of the electrical plug and structured to be electrically connected to a neutral power source conductor;
    electrical monitoring circuitry enclosed within the housing and electrically connected to the hot slot and the neutral slot, the electrical monitoring circuitry being configured to monitor a plurality of operating conditions of the GFCI arrangement; and
    an indication system electrically connected to the electrical monitoring circuitry and configured to indicate on the housing a plurality of indication states indicative of the operating conditions of the GFCI arrangement, the indication system comprising:
        a number of indication windows formed on a rear side of the front of the housing within an interior of the housing; and
        a number of illumination arrangements enclosed within the housing, the number of illumination arrangements corresponding in number to the number of indication windows such that each one of the illumination arrangements is structured to illuminate a corresponding one of the indication windows,
    wherein at least one of the indication windows includes a body of text formed on the rear side of the front of the housing, said body of text being structured to be visible only when illuminated by the at least one of the illumination arrangements corresponding to the at least one indication window,
    wherein the plurality of indication states comprises a normal operating state and a trip condition state, and
    wherein a first of the illumination arrangements corresponding to the trip state is structured to illuminate a corresponding first of the indication windows upon detection of the trip condition state by the electrical monitoring circuitry.

2. The GFCI arrangement of claim 1,
    wherein, for each indication window, at least a portion of the indication window is thinner than a portion of the front of the housing surrounding the indication window.

3. The GFCI arrangement of claim 1,
    wherein the housing further comprises a reset button, wherein the first indication window corresponding to the trip state is disposed on the reset button.

4. The GFCI arrangement of claim 3,
    wherein actuating the reset button while the GFCI is in the trip condition state resets the GFCI to the normal operating state.

5. The GFCI arrangement of claim 4,
    wherein the housing further comprises a test button structured to put the GFCI arrangement into the trip condition state from the normal operating state when the test button is actuated.

6. The GFCI arrangement of claim 1,
    wherein the plurality of indication states further comprises an end-of-life state in which the monitoring circuit has detected that the GFCI arrangement cannot function as intended, and
    wherein a second of the illumination arrangements corresponding to the end-of-life state is structured to illuminate a corresponding second of the indication windows upon detection of the end-of-life state by the electrical monitoring circuitry.

7. The GFCI arrangement of claim 1,
    wherein the body of text included in the at least one of the indication windows is formed via molding or embossing.

8. The GFCI arrangement of claim 1,
    wherein each of the illumination arrangements comprises a light source electrically connected to and structured to be powered by the electrical monitoring circuitry, and
    wherein, upon detection of any of a number of certain predetermined operating conditions by the electrical monitoring circuitry, the electrical monitoring circuitry is configured to selectively power the light source of the illumination arrangement corresponding to the indication state that corresponds to a detected one of the number of predetermined operating conditions.

9. The GFCI arrangement of claim 8,
    wherein the number of predetermined operating conditions comprise a first operating condition corresponding to the trip condition state and a second operating condition corresponding to an end-of-life state.

10. The GFCI arrangement of claim 8,
    wherein the light source of each of the illumination arrangements comprises an LED and a light pipe,
    wherein each LED is electrically connected to the electrical monitoring circuitry, and
    wherein each light pipe is disposed between its corresponding LED and its corresponding indication window.

11. The GFCI arrangement of claim 1,
    wherein the housing comprises a front enclosure in which the hot slot and the neutral slot are formed, a middle enclosure, and a rear enclosure,
    wherein a front side of the middle enclosure is coupled to a rear side of the front enclosure, and
    wherein a front side of the rear enclosure is coupled to a rear side of the middle enclosure.

12. The GFCI arrangement of claim 11,
    wherein each of the illumination arrangements comprises a light pipe and an LED,
    wherein, for each of the at least one of the indication windows that includes a body of text, the light pipe of each of the corresponding at least one illumination arrangements comprises a first portion and a second portion continuous with the first portion,
    wherein the first portion of the light pipe is disposed between the front side of the middle enclosure and the corresponding indication window, the corresponding indication window being formed in the rear side of the front enclosure, and wherein the second portion of the light pipe extends from a front end continuous with the first portion of the light pipe to a rear end disposed opposite the front end at the rear side of the middle enclosure.

13. The GFCI arrangement of claim 11, further comprising:
a wall plate structured to surround the electrical receptacles when the GFCI arrangement is installed in a wall,
wherein the middle enclosure includes a block of text stating the GFCI product information, and
wherein the wall plate comprises an opening structured to display the GFCI product information included on the middle enclosure block of text when the GFCI arrangement is installed in the wall.

14. The GFCI arrangement of claim 1,
wherein each of the electrical receptacles comprises a tamper resistant shutter structured to prevent non-electrical plug objects inserted into the hot slot or neutral slot from accessing the hot power source conductor and the neutral power source conductor.

15. The GFCI arrangement of claim 1,
wherein the electrical monitoring circuitry is configured to not actuate illumination of any of the indication windows when the GFCI is in the normal operating state.

16. An electrical receptacle arrangement comprising:
a housing;
a number of electrical receptacles, each of the number of receptacles comprising a hot slot structured to receive a hot prong of an electrical plug and a neutral slot structured to receive a neutral prong of the electrical plug;
electrical monitoring circuitry enclosed within the housing and electrically connected to the hot slot and the neutral slot, the electrical monitoring circuitry being configured to monitor a plurality of operating conditions of the receptacle arrangement; and
an indication system electrically connected to the electrical monitoring circuitry and configured to indicate on the housing a plurality of indication states indicative of the operating conditions of the receptacle arrangement, the indication system comprising:
a number of indication windows formed on a rear side of the front of the housing within an interior of the housing; and
a number of illumination arrangements enclosed within the housing, the number of illumination arrangements corresponding in number to the number of indication windows such that each one of the illumination arrangements is structured to illuminate a corresponding one of the indication windows,
wherein the plurality of indication states comprises a normal operating state, a trip condition state, and an end-of-life state,
wherein a first of the illumination arrangements corresponding to the trip state is structured to illuminate a corresponding first of the indication windows upon detection of the trip condition state by the electrical monitoring circuitry,
wherein a second of the illumination arrangements corresponding to the end-of-life state is structured to illuminate a corresponding second of the indication windows upon detection of the end-of-life state by the electrical monitoring circuitry, and wherein the second of the indication windows includes a body of text formed in the window, said body of text denoting the end-of-life state and being structured to be visible only when illuminated by the second illumination arrangement.

17. The electrical receptacle arrangement of claim 16,
wherein, for each indication window, at least a portion of the indication window is thinner than a portion of the front of the housing surrounding the indication window.

18. The electrical receptacle arrangement of claim 16,
wherein the body of text is formed via molding or embossing.

19. The electrical receptacle arrangement of claim 16,
wherein each of the illumination arrangements comprises an LED and a light pipe,
wherein each LED is electrically connected to and configured to be selectively powered by the electrical monitoring circuitry, and
wherein each light pipe is disposed between its corresponding LED and its corresponding indication window.

20. An electrical receptacle arrangement comprising:
a housing;
a number of electrical receptacles, each of the number of receptacles comprising a hot slot structured to receive a hot prong of an electrical plug and a neutral slot structured to receive a neutral prong of the electrical plug;
electrical monitoring circuitry enclosed within the housing and electrically connected to the hot slot and the neutral slot, the electrical monitoring circuitry being configured to monitor a plurality of operating conditions of the receptacle arrangement; and
an indication system electrically connected to the electrical monitoring circuitry and configured to indicate on the housing a plurality of indication states indicative of the operating conditions of the receptacle arrangement, the indication system comprising:
a number of indication windows formed on an interior side of the housing; and
a number of illumination arrangements enclosed within the housing, the number of illumination arrangements corresponding in number to the number of indication windows such that each one of the illumination arrangements is structured to illuminate a corresponding one of the indication windows, and each of the number of illumination arrangements comprising a light source electrically connected to the electrical monitoring circuitry and a light pipe,
wherein, for each indication window, at least a portion of the indication window is thinner than a portion of the interior side of the housing surrounding the indication window,
wherein the plurality of indication states comprises a normal operating state, a trip condition state, and an end-of-life state,
wherein a first of the illumination arrangements corresponding to the trip state is structured to illuminate a corresponding first of the indication windows upon detection of the trip condition state by the electrical monitoring circuitry,
wherein a second of the illumination arrangements corresponding to the end-of-life state is structured to illuminate a corresponding second of the indication windows upon detection of the end-of-life state by the electrical monitoring circuitry, and wherein the second of the indication windows includes a body of text formed in the window, said body of text denoting the end-of-life state and being structured to be visible only when illuminated by the second illumination arrangement.

\* \* \* \* \*